US009999338B2

(12) United States Patent
Boyer

(10) Patent No.: US 9,999,338 B2
(45) Date of Patent: Jun. 19, 2018

(54) FILTER ASSEMBLY FOR A DISHWASHER APPLIANCE

(71) Applicant: General Electric Company, Schenectady, NY (US)

(72) Inventor: Joel Charles Boyer, Louisville, KY (US)

(73) Assignee: Haier US Appliance Solution, Inc., Wilmington, DE (US)

( * ) Notice: Subject to any disclaimer, the term of this patent is extended or adjusted under 35 U.S.C. 154(b) by 179 days.

(21) Appl. No.: 14/987,862

(22) Filed: Jan. 5, 2016

(65) Prior Publication Data

US 2017/0188782 A1   Jul. 6, 2017

(51) Int. Cl.
*A47L 15/42* (2006.01)
*B01D 29/56* (2006.01)
*B01D 29/94* (2006.01)

(52) U.S. Cl.
CPC ....... *A47L 15/4202* (2013.01); *A47L 15/4225* (2013.01); *B01D 29/56* (2013.01); *B01D 29/945* (2013.01)

(58) Field of Classification Search
CPC ........ B01D 29/56; B01D 29/58; B01D 29/62; B01D 29/6415; B01D 29/6476; B01D 29/666; A47L 15/4202; A47L 15/4204; A47L 15/4206; A47L 15/4208; A47L 15/4227
See application file for complete search history.

(56) References Cited

U.S. PATENT DOCUMENTS

| 7,350,527 | B2 | 4/2008 | Gurubatham et al. |
| 8,627,832 | B2 | 1/2014 | Fountain et al. |
| 8,714,167 | B2 | 5/2014 | Yoon et al. |
| 2004/0007253 | A1* | 1/2004 | Jung ................ A47L 15/4206 134/10 |
| 2010/0187190 | A1* | 7/2010 | Kehl ................ A47L 15/4204 210/791 |
| 2013/0174879 | A1* | 7/2013 | Welch .............. A47L 15/4204 134/111 |
| 2014/0158168 | A1 | 6/2014 | Thiyagarajan |

* cited by examiner

*Primary Examiner* — David G Cormier
(74) *Attorney, Agent, or Firm* — Dority & Manning, P.A.

(57) ABSTRACT

A filter assembly for filtering a wash fluid to be circulated by a circulation pump in a dishwasher appliance is provided. The filter assembly defines an axial direction and includes a first filter member including a first filter panel and defining a first discharge opening, and a second filter member including a second filter panel and defining a second discharge opening. The second filter panel is spaced from the first filter panel along the axial direction and configured in series flow with the first filter panel. The filter assembly further includes a circumferentially continuous discharge chamber disposed radially outward of the first filter member and the second filter member, the discharge chamber in fluid communication with the first filter member through the first discharge opening and in fluid communication with the second filter member through the second discharge opening.

18 Claims, 6 Drawing Sheets

FILTER ASSEMBLY FOR A DISHWASHER APPLIANCE

FIELD OF THE INVENTION

The present subject matter relates generally to dishwasher appliances and more particularly to filter assemblies for dishwasher appliances.

BACKGROUND OF THE INVENTION

During wash and rinse cycles, dishwasher appliances generally circulate a fluid through a wash chamber over articles, such as pots, pans, silverware, etc. The fluid can be, e.g., various combinations of water and detergent during the wash cycle, or water (which may include additives) during the rinse cycle. Typically, the fluid is circulated during a given cycle using a pump. Fluid is collected at or near the bottom of the wash chamber and pumped back into the wash chamber through, e.g., nozzles in spray arms and other openings that direct the fluid against the articles to be cleaned or rinsed.

Depending upon the level of soil on the articles, fluids used during wash and rinse cycles can become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and soils are removed or reduced from the fluid supplied to the pump.

Accordingly, dishwasher appliances are generally provided with a filter assembly to trap at least certain of the soils carried with the wash fluid. Such filter assemblies generally include a course filter and a fine filter in a parallel flow configuration. For example, during a wash cycle a portion of the recirculated wash fluid may pass through the coarse filter and a portion of the recirculated wash fluid may pass through the fine filter. Through the course of the wash cycle, it is expected that substantially all of the wash fluid will pass through the fine filter, such that eventually all soils larger than a maximum predetermined size (i.e., a size of soils filtered by the fine filter) are removed from the wash fluid.

One issue with such parallel configurations of coarse and fine filters is that during shortened cycles or due to other factors, some soils may not necessarily encounter both sizes of filter. Accordingly, some soils, such as soils small enough to pass through the coarse filter but large enough to be trapped by fine filter, may remain in the wash fluid. Further, larger soils may clog the fine filter if they are trapped by the fine filter before encountering the coarse filter.

Accordingly, improved filter assemblies have been provided for use in dishwasher appliances which utilize a series arrangement of filters, in which the wash fluid progressively flows through filters that have smaller and smaller holes. Additionally, blades may be provided adjacent the filters to generally unclog soil from the filters and guide the soil towards discharge areas. It is generally desirable for these blades to be in close proximity to respective filters to facilitate such cleaning.

While such filter assemblies provide advantages with regard to filtering, improvements could be made with respect to the discharge of soil from the filters. For example, in some cases, soil is guided towards and into discharge areas. However, backpressure can build within the discharge areas during operation and cause the soil in some cases to flow back through the discharge areas and adjacent to the filters.

Accordingly, improved filter assemblies are desired. In particular, filter assemblies which provide improved soil discharge would be advantageous.

BRIEF DESCRIPTION OF THE INVENTION

Aspects and advantages of the invention will be set forth in part in the following description, or may be apparent from the description, or may be learned through practice of the invention.

In accordance with one embodiment, a filter assembly for filtering a wash fluid to be circulated by a circulation pump in a dishwasher appliance is provided. The filter assembly defines an axial direction and includes a first filter member including a first filter panel and defining a first discharge opening, and a second filter member including a second filter panel and defining a second discharge opening. The second filter panel is spaced from the first filter panel along the axial direction and configured in series flow with the first filter panel such that the wash fluid is filtered by the first filter panel and by the second filter panel prior to being recirculated by the circulation pump. The filter assembly further includes a circumferentially continuous discharge chamber disposed radially outward of the first filter member and the second filter member, the discharge chamber in fluid communication with the first filter member through the first discharge opening and in fluid communication with the second filter member through the second discharge opening.

In accordance with another embodiment, a dishwasher appliance defining a vertical direction is provided. The dishwasher appliance includes a tub defining a wash chamber, a sump positioned at a bottom portion of the tub along the vertical direction, a circulation pump for circulating a wash fluid in the sump to the wash chamber, and a filter assembly disposed within the sump and in flow communication with the circulation pump, the filter assembly defining an axial direction. The filter assembly includes a first filter member including a first filter panel and defining a first discharge opening, and a second filter member including a second filter panel and defining a second discharge opening. The second filter panel is spaced from the first filter panel along the axial direction and configured in series flow with the first filter panel such that the wash fluid is filtered by the first filter panel and by the second filter panel prior to being recirculated by the circulation pump. The filter assembly further includes a circumferentially continuous discharge chamber disposed radially outward of the first filter member and the second filter member, the discharge chamber in fluid communication with the first filter member through the first discharge opening and in fluid communication with the second filter member through the second discharge opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention,

BRIEF DESCRIPTION OF THE DRAWINGS

A full and enabling disclosure of the present invention, including the best mode thereof directed to one of ordinary skill in the art, is set forth in the specification, which makes reference to the appended figures.

DETAILED DESCRIPTION

Figure 1:
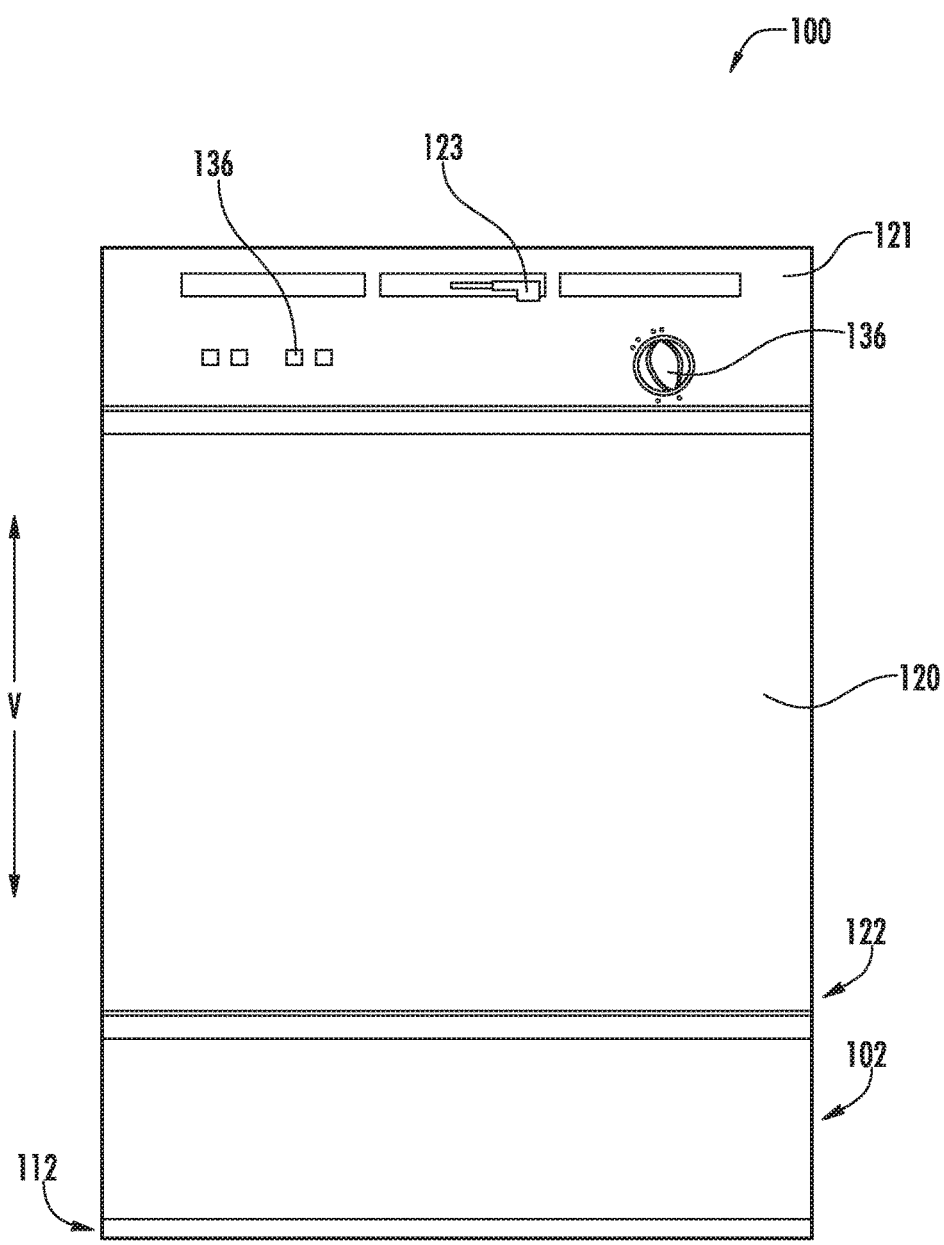
FIG. 1 provides a front elevation view of a dishwasher appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", etc. may be used interchangeably to distinguish one component from another and are not intended to signify location or importance of the individual components.

Figure 2:
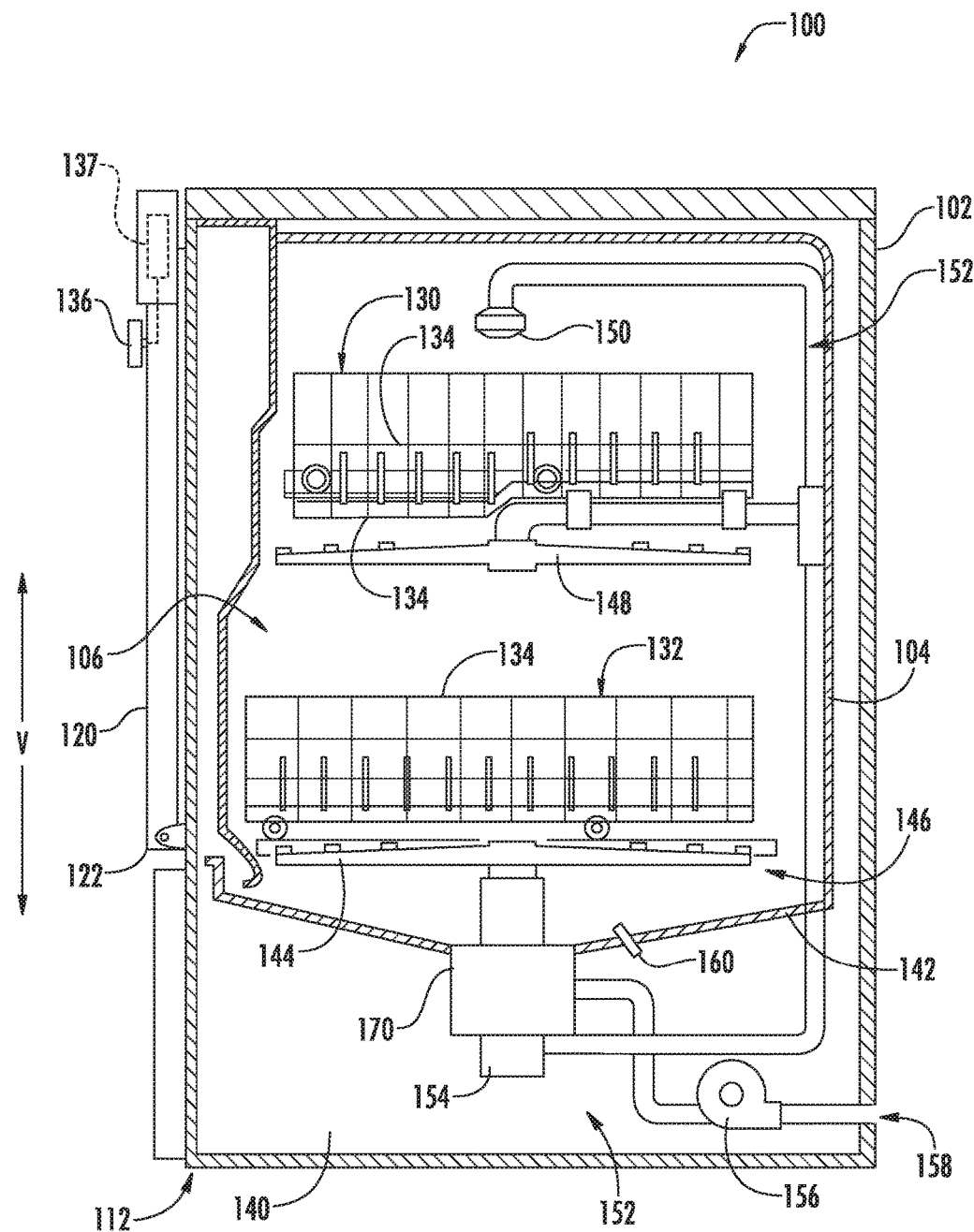
FIG. 2 provides a side, sectional view of the exemplary dishwasher appliance of FIG. 1.

FIGS. 1 and 2 depict a dishwasher appliance 100 according to an exemplary embodiment of the present subject matter. FIG. 1 provides a front view of the exemplary dishwasher appliance 100, and FIG. 2 provides a side, sectional view of the exemplary dishwasher appliance 100.

As shown, dishwasher appliance 100 defines a vertical direction V and includes a cabinet 102. Cabinet 102 has a tub 104 therein that defines a wash chamber 106. The tub 104 also defines a front opening (not shown). Dishwasher appliance 100 includes a door 120 hinged at a bottom 122 of door 120 for movement between a normally closed, vertical position (shown in FIGS. 1 and 2), wherein wash chamber 106 is sealed shut for washing operation, and a horizontal, open position for loading and unloading of articles from dishwasher appliance 100. A latch 123 is used to lock and unlock door 120 for access to wash chamber 106. Tub 104 also includes a sump assembly 170 shown schematically positioned adjacent a bottom portion 112 of tub 104 and configured for receipt of a liquid wash fluid (e.g., water, detergent, wash fluid, and/or any other suitable fluid) during operation of dishwasher appliance 100. More particularly, sump assembly 170 is shown attached to a bottom wall 142 of tub 104. As will be explained in greater detail below, the exemplary dishwasher appliance 100 may further include a filter assembly (not shown), such as a filter assembly 204 (see FIG. 3), disposed within sump assembly 170.

A spout 160 is positioned adjacent sump assembly 170 of dishwasher appliance 100. Spout 160 is configured for directing liquid into sump assembly 170. Spout 160 may receive liquid from, e.g., a water supply (not shown) or any other suitable source. In alternative embodiments, spout 160 may be positioned at any suitable location within dishwasher appliance 100, e.g., such that spout 160 directs liquid into tub 104. Spout 160 may include a valve (not shown) such that liquid may be selectively directed into tub 104. Thus, for example, during the cycles described below, spout 160 may selectively direct water and/or wash fluid into sump assembly 170 as required by the cycle of dishwasher appliance 100.

Rack assemblies 130 and 132 are slidably mounted within wash chamber 106. Each of the rack assemblies 130 and 132 is fabricated into lattice structures including a plurality of elongated members 134. Each rack of the rack assemblies 130 and 132 is adapted for movement between an extended loading position (not shown) in which the rack is substantially positioned outside the wash chamber 106, and a retracted position (shown in FIGS. 1 and 2) in which the rack is located inside the wash chamber 106. A silverware basket (not shown) may be removably attached to rack assembly 132 for placement of silverware, utensils, and the like, that are otherwise too small to be accommodated by the racks 130 and 132.

Dishwasher appliance 100 further includes a lower spray assembly 144 that is rotatably mounted within a lower region 146 of the wash chamber 106 and above sump assembly 170 so as to rotate in relatively close proximity to rack assembly 132. A mid-level spray assembly 148 is located in an upper region of the wash chamber 106 and may be located in close proximity to upper rack 130. Additionally, an upper spray assembly 150 may be located above the upper rack 130.

The lower and mid-level spray assemblies 144 and 148 and the upper spray assembly 150 are fed by a fluid circulation assembly 152 for circulating water and/or dishwasher fluid (collectively, "wash fluid") in the tub 104. Fluid circulation assembly 152 may include a wash or circulation pump 154 and a cross-flow/drain pump 156 located in a machinery compartment 140 located below sump assembly 170 of the tub 104, as generally recognized in the art. Cross-flow/drain pump 156 is configured for urging wash fluid within sump assembly 170 out of tub 104 and dishwasher appliance 100 to a drain 158. Circulation pump 154 is configured to provide a flow of recirculated wash fluid to tub 104 and wash chamber 106. More particularly, circulation pump 154 is configured for supplying a flow of wash fluid from sump assembly 170 to spray assemblies 144, 148 and 150 via a plurality of circulation conduits (not labeled).

Each spray assembly 144 and 148 includes an arrangement of discharge ports or nozzles for directing wash fluid onto dishes or other articles located in rack assemblies 130 and 132. The arrangement of the discharge ports in spray assemblies 144 and 148 provides a rotational force by virtue of wash fluid flowing through the discharge ports. The resultant rotation of the lower spray assembly 144 provides coverage of dishes and other dishwasher contents with a spray of wash fluid.

Dishwasher appliance 100 is further equipped with a controller 137 (shown in phantom) to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated embodiment, controller 137 may be located within a control panel area 121 of door 120 as shown. In such an embodiment, input/output ("I/O") signals may be routed between the control system and various operational components of dishwasher appliance 100 along wiring harnesses that may be routed through the bottom 122 of door 120. Typically, controller 137 includes a user interface 136 through which a user may select various operational features and modes and monitor progress of the dishwasher appliance 100. In one embodiment, user interface 136 may represent a general purpose I/O ("GPIO") device or functional block. Additionally or alternatively, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication with controller 137 via one or more signal lines or shared communication busses.

It should be appreciated that the subject matter disclosed herein is not limited to any particular style, model or configuration of dishwasher appliance, and that the embodiment depicted in FIGS. 1 and 2 is for illustrative purposes only. For example, instead of the racks 130 and 132 depicted in FIG. 1, dishwasher appliance 100 may be of a known configuration that utilizes drawers that pull out from the cabinet and are accessible from the top for loading and unloading of articles.

Figure 3:
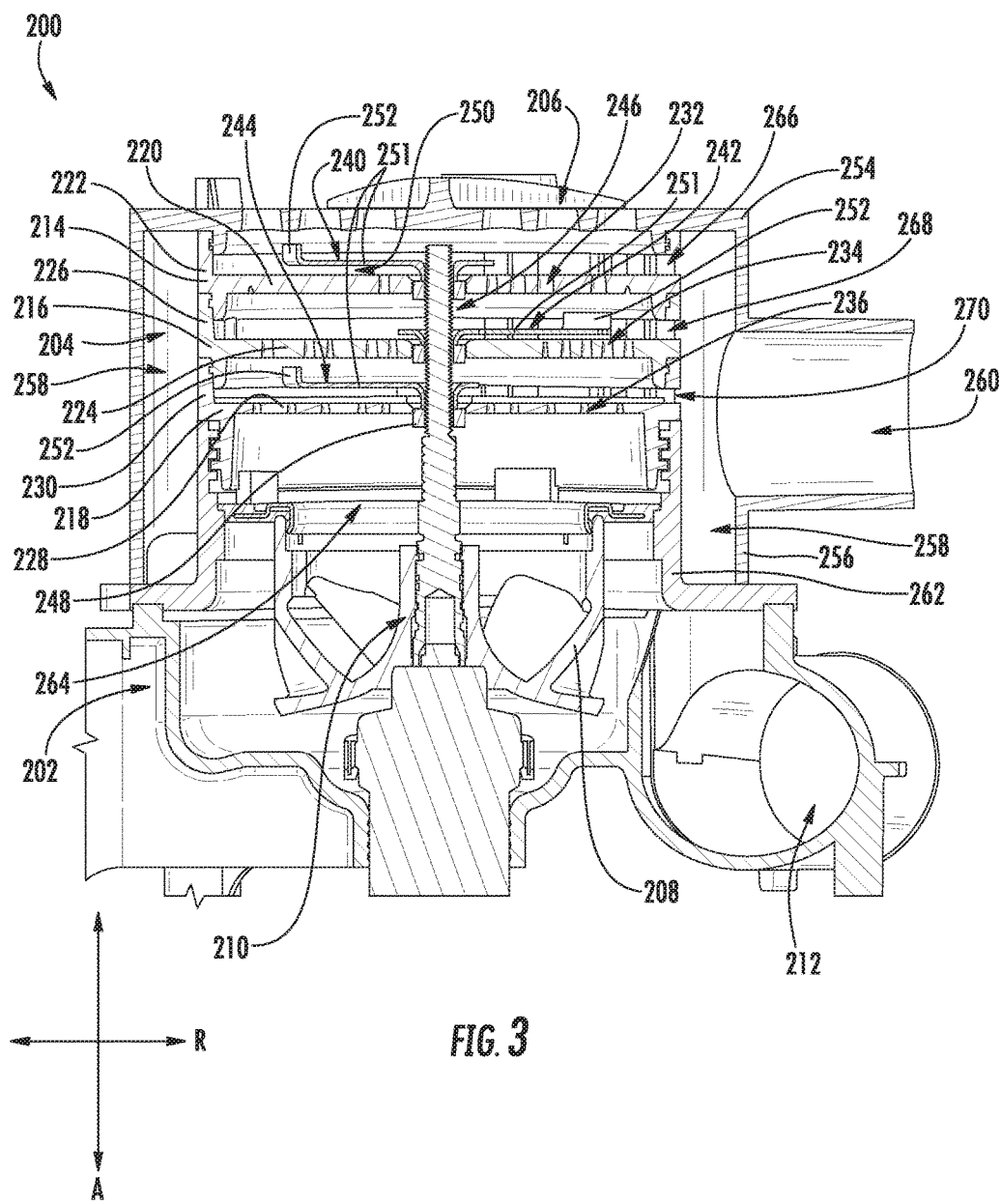
FIG. 3 provides a side, cross-sectional view of a sump and circulation pump in accordance with one embodiment of the present disclosure.
Figure 4:
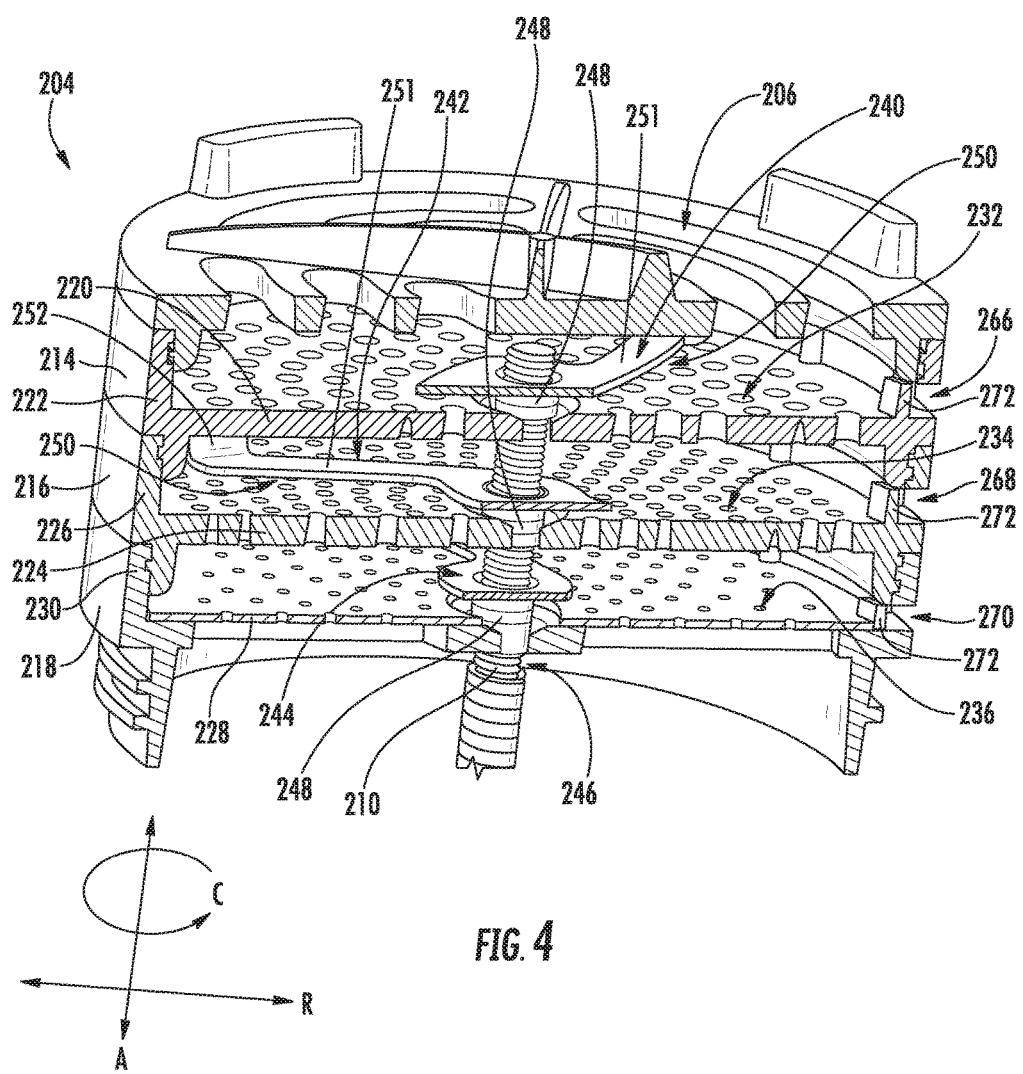
FIG. 4 provides a perspective cross-sectional view of a filter assembly in accordance with one embodiment of the present disclosure, FIG. 5 provides a close up perspective view of a filter member of the exemplary filter assembly of FIG. 4.

Reference will now be made to FIGS. 3 and 4. FIG. 3 provides a cross-sectional view of a portion of a sump 200 and circulation pump 202 in accordance with an exemplary embodiment of the present disclosure. Additionally, FIG. 4 provides a cross-sectional and perspective view of a filter assembly 204 in accordance with an exemplary embodiment of the present disclosure. In certain exemplary embodiments, sump 200 and circulation pump 202 may be configured as sump assembly 170 and circulation pump 154 in the exemplary dishwasher appliance 100 of FIGS. 1 and 2.

As is depicted, sump 200 generally includes a filter assembly 204 disposed within sump 200 defining an axial direction A, a radial direction R, and a circumferential direction C. Circulation pump 202 is positioned adjacent to filter assembly 204 and in flow communication with filter assembly 204. Circulation pump 202 is configured to circulate or recirculate water/wash fluid from wash chamber 106 of tub 104. More particularly, circulation pump 202 is configured to urge a flow of wash fluid to be recirculated from wash chamber 106 of dishwasher appliance 100, through an inlet 206 in sump 200, and through filter assembly 204. Inlet 206 of sump 200 may be configured as an opening, e.g., in a bottom wall 142 of tub 104 of dishwashing appliance 100. From filter assembly 204, circulation pump 202 is configured to provide the flow of wash fluid to the tub 104 and wash chamber 106, or more particularly to provide the flow of wash fluid through one or more circulation conduits to one or more spray assemblies, such as spray assemblies 144, 148, 150 depicted in FIG. 2.

Circulation pump 202 generally includes an impeller 208, a shaft 210, and an electric motor (not shown). Shaft 210 extends generally along the axial direction A, and is rotatable in the circumferential direction C (i.e., about the axial direction A) by the motor. Impeller 208 is fixed to shaft 210 and rotated by shaft 210. Rotation of impeller 208 in the circumferential direction C by shaft 210 generates the flow of wash fluid to be recirculated through filter assembly 204 and into an outlet 212 of circulation pump 202. Outlet 212 of circulation pump 202 may be fluidly connected with the one or more circulation conduits to circulate or recirculate the wash fluid. For example, outlet 212 of circulation pump 202 may provide wash fluid to the one or more spray assemblies, such as spray assemblies 144, 148, 150 depicted in FIG. 2.

For the exemplary embodiment depicted, filter assembly 204 generally includes a plurality of stacked filter members configured in series flow. Accordingly, wash fluid to be recirculated flows sequentially through each of the plurality of filter members prior to being recirculated by circulation pump 202. With such a configuration, all wash fluid circulated or recirculated by circulation pump 202 is filtered by each of the plurality of filter members before reaching the circulation pump 202. Therefore, all wash fluid to be recirculated by circulation pump 202 may be filtered in a "single-pass" through filter assembly 204.

More particularly, for the embodiment depicted, the one or more filter members include a first filter member 214, a second filter member 216, and a third filter member 218. First filter member 214 defines a first filter panel 220 and a first outer wall 222 extending around a perimeter of first filter panel 220. Similarly, second filter member 216 defines a second filter panel 224 and a second outer wall 226 extending around a perimeter of the second filter panel 224, and the third filter member 218 defines a third filter panel 228 with a third outer wall 230 extending around a perimeter of the third filter panel 228.

Additionally, each of the one or more filter members are attached such that the respective filter panels are substantially parallel to one another. For example, the first filter panel 220 is substantially parallel to both second filter panel 224 and third filter panel 228. Moreover, for the embodiment depicted, first outer wall 222 is attached to second outer wall 226 using a screw-type connection, and second outer wall 226 is attached to third outer wall 230 also using a screw-type connection. However, in other embodiments, first, second, and third outer walls 222, 226, 230 may each be attached to one another in any other suitable manner.

Each of first, second, and third filter panels 220, 224, 228 are configured to prevent soils, such as food particles or other debris, greater than a predetermined size for the respective filter panel from passing therethrough. Additionally, each of the plurality of filter members 214, 216, 218 are configured to sequentially filter and remove smaller particles from the wash fluid to be recirculated. More particularly, as is depicted, first filter panel 220 defines a plurality of first filter openings 232, second filter panel 224 defines a plurality of second filter openings 234, and third filter panel 228 defines a plurality of third filter openings 236. First filter openings 232 are larger than second filter openings 234, and second filter openings 234 are larger than third filter openings 236. Accordingly, first filter member 214 may be referred to as a "coarse" filter, second filter member 216 may be referred to as a "medium" filter member, and third filter member 218 may be referred to as a "fine" filter member. Therefore, filter assembly 204 depicted may filter all particles larger than third filter openings 236 from the wash fluid to be recirculated in a single-pass through filter assembly 204.

For the embodiment depicted, each of first filter panel 220, second filter panel 224, and third filter panel 228 are configured as a wall defining first filter openings 232, second filter openings 234, and third filter openings 236, respectively. However, in other exemplary embodiments, first, second, and/or third filter panels 220, 224, 228 may instead be configured to include any other suitable filter medium, such as, e.g., a mesh filter.

Shaft 210 of circulation pump 202 extends through the plurality of filter members 214, 216, 218. More particularly, for the embodiment depicted, shaft 210 extends through third filter panel 228 of third filter member 218, through second filter panel 224 of second filter member 216, and through first filter panel 220 of first filter member 214. Filter assembly 204 depicted in FIGS. 3 and 4 further includes discharge blades attached to shaft 210 adjacent to the respective filter panels 220, 224, 228. More particularly, exemplary filter assembly 204 depicted includes a first discharge blade 240, a second discharge blade 242, and a third discharge blade 244. First discharge blade 240 is attached to shaft 210 and positioned adjacent to first filter panel 220; second discharge blade 242 is attached to shaft 210 and is positioned adjacent to the second filter panel 224; and third discharge blade 244 is attached to shaft 210 and positioned adjacent to third filter panel 228.

Each of the discharge blades 240, 242, 244 may be attached to shaft 210 in any suitable manner. For example, in the embodiment depicted, shaft 210 defines a plurality of circumferential threads 246 and the first, second and third discharge blades 240, 242, 244 are each screwed onto circumferential threads 246 of shaft 210. Notably, shaft 210 includes a plurality of setpoints 248 attached to shaft 210 adjacent to each of the blades 240. 242. 244 to ensure each the blades 240. 242. 244 defines a desired gap 250 along the axial direction A with the respective filter panel 220, 224, 228. For example, the discharge blades may be configured such that the blades define a gap 250 of between about five thousandths of an inch and about fifty thousandths of an inch.

It should be appreciated, however, that in other exemplary embodiments, each of the blades 240, 242, 244 may instead be set in position using any other suitable mechanism and may define any other suitable gap 250 with the respective filter panel 220, 224, 228. For example, in other exemplary embodiments, filter assembly 204 may instead include a washer between each of the blades 240, 242, 244 and the respective filter panel 220, 224, 228. Additionally, in other embodiments, filter assembly 204 may define a gap 250 of between about ten thousandths of an inch and about thirty thousandths of an inch, or between about fifteen thousandths of an inch and about twenty thousandths of an inch. Moreover, each of the blades 240, 242, 244 may define different gaps 250 with first, second, and third panels 220, 224, 228, respectively. It should also be appreciated, that as used herein, terms of approximation, such as "approximately" and "about," refer to being within a ten percent margin of error.

Each of the exemplary blades 240, 242, 244 include a pair of arms 251 extending generally outwardly along the radial direction R from shaft 210. Additionally, each of the arms 251 include a lip 252 extending generally along the axial direction A away from the respective filter panels 220, 224, 228 at radially outer ends of the respective arms. Further, lips 252 each define an angle with respect to the radial direction R (see also FIG. 5). For example the angle of the lips 252 relative to the radial direction R may be between about zero degrees and about ninety degrees, such as between about fifteen degrees and about seventy-five degrees, such as between about thirty degrees and about sixty degrees, such as about forty-five degrees. Blades 240, 242, 244 are configured to rotate in the circumferential direction C with shaft 210 and may serve the functions of chopping particles greater than size of the respective filter openings 232, 234, 236 and/or moving particles greater than a size of the respective filter openings 232, 234, 236 outwardly along the radial direction R, as will be discussed below. Moreover, lips 252 may generate an amount of flow of wash fluid outwardly along the radial direction R, as will be discussed below.

Figure 6:
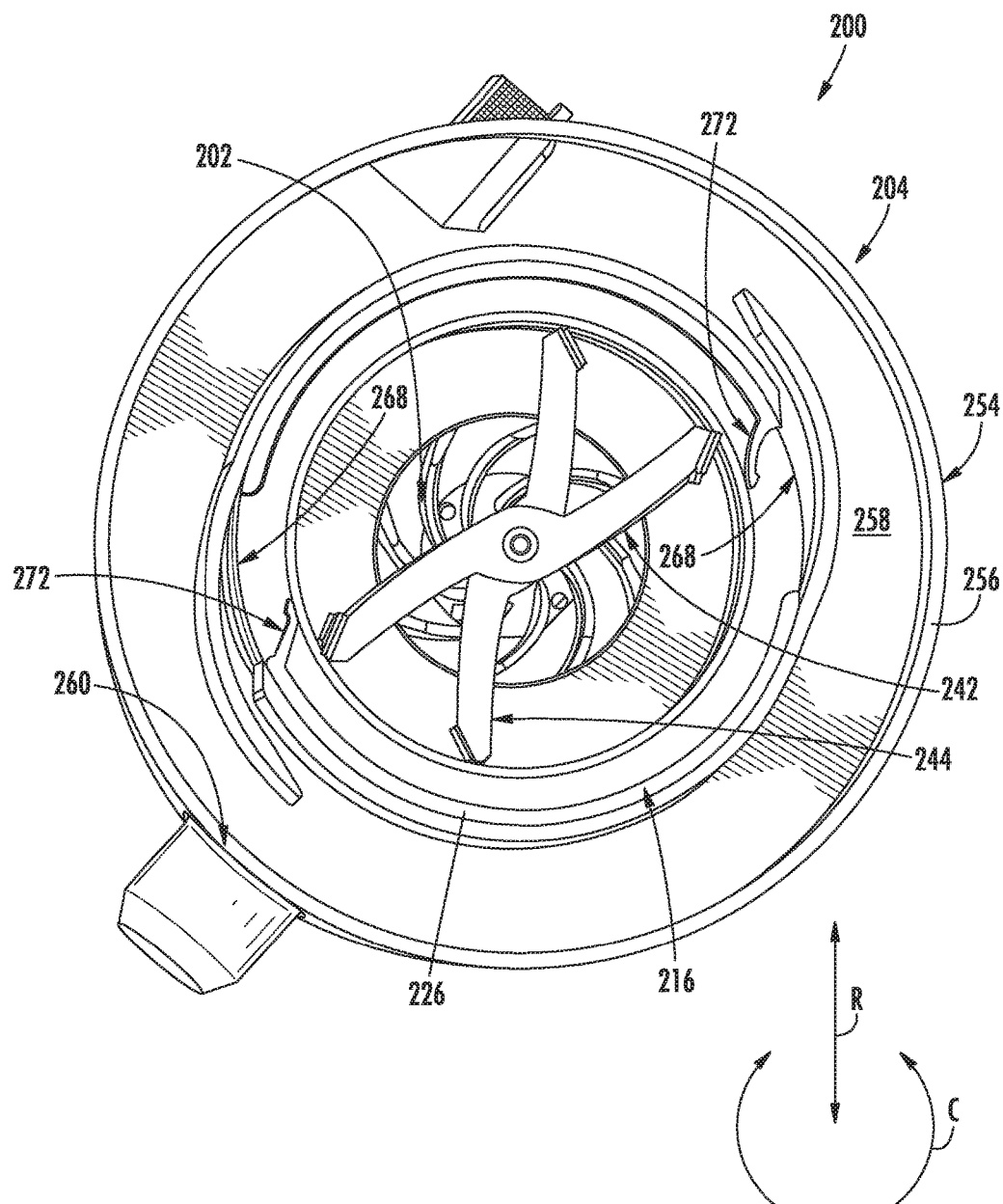
FIG. 6 provides a top, sectional view of a filter assembly in accordance with one embodiment of the present disclosure.

Referring particularly to FIG. 3 as well as to FIG. 6, sump 200 and filter assembly 204 thereof may include a housing 254 with a peripheral wall 256 extending around the one or more filter members. Peripheral wall 256 may thus circumferentially surround the filter members 214, 216, 218. More particularly, peripheral wall 256 extends around first, second, and third filter members 214, 216, 218 and defines a discharge chamber 258 with first, second, and third filter members 214, 216, 218. More particularly, peripheral wall 256 defines discharge chamber 258 with outer walls 222, 226, 230 of the respective filter assemblies 214, 216, 218. Discharge chamber 258 is thus defined between the peripheral wall 256 and the outer walls 222, 226, 230. Additionally, peripheral wall 256 defines an outlet 260. Outlet 260 is in fluid communication with a drain pump (not shown), such as drain pump 156 depicted in FIG. 2, Filter members 214, 216, 218 attach to housing 254 below inlet 206 using a screw type connection. However, in other embodiments, the one or more filter members may attached to housing 254 in any other suitable manner, or alternatively at least one of the one or more filter members may be formed integrally with housing 254 of sump 200. In some embodiments, filter assembly 204 may include a transition member 262 attached to a filter member, or more particularly attached to third filter member 218. Transition member 262 makes a connection between the one or more filter members and impeller 208 of circulation pump 202. Accordingly, transition member 262 defines filter assembly outlet 264 whereby filtered wash fluid to be recirculated passes into circulation pump 202. Alternatively, one of the filter members, such as the third filter member 218, may connect directly to the impeller 208 and define the outlet 264.

Figure 5:
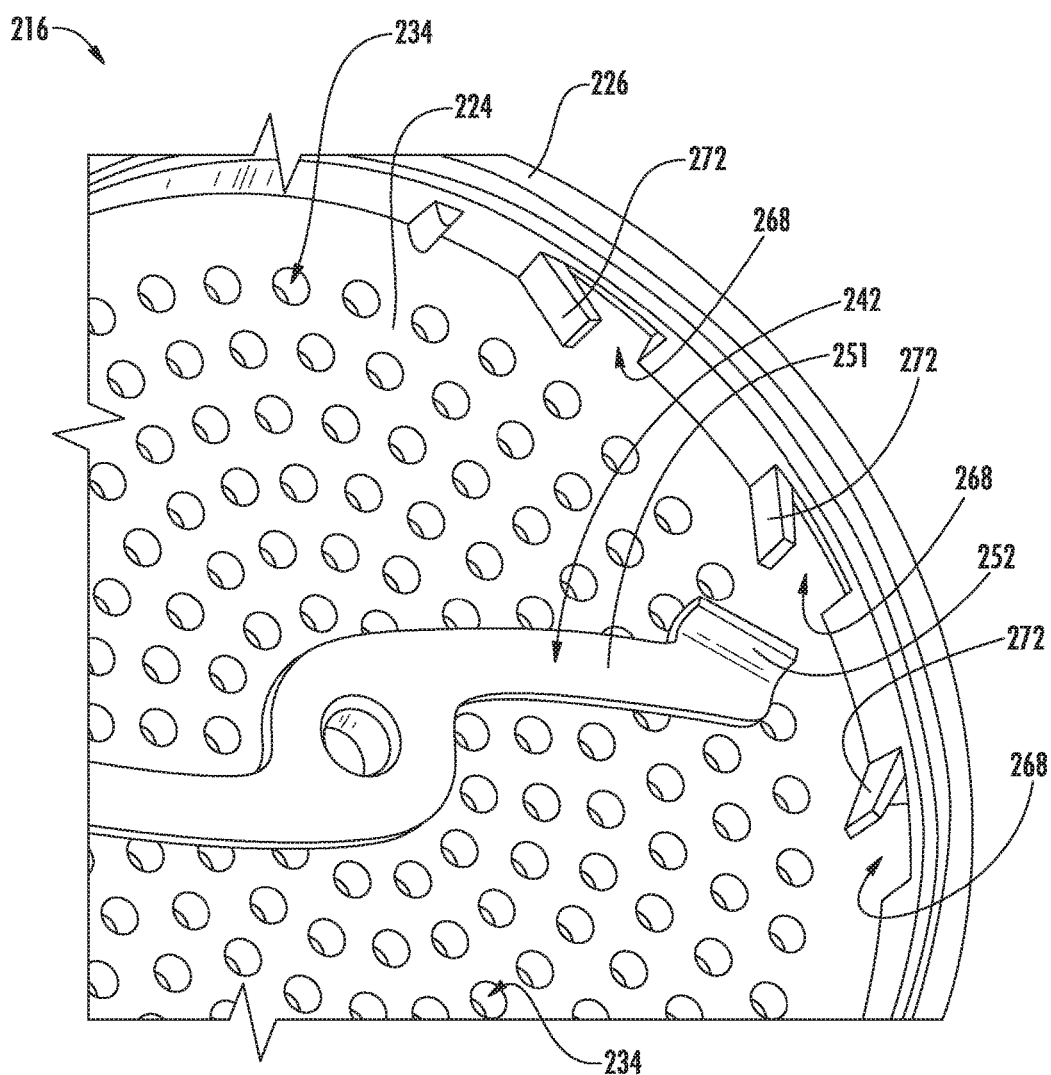

Referring now also to FIG. 5, a close-up perspective view of second filter member 216 is provided. Outer walls 222, 226, 230 of each of the respective filter members 214, 216, 218 define one or more discharge openings that allow for soils to pass from a respective filter panel 220, 224, 228 to discharge chamber 258. For example, first outer wall 222 of first filter member 214 defines one or more first discharge openings 266; second outer wall 226 of the second filter member 216 defines one or more second discharge openings 268; and third outer wall 230 of third filter member 218 defines one or more third discharge openings 270. For the embodiment depicted, each filter member 214, 216, 218 further includes guide members 272 slanting inwardly along the radial direction R from the respective outer walls 222, 226, 230 adjacent to each of the respective discharge openings 266, 268, 270. More particularly, the guide members 272 slant towards the discharge openings 264, 266, 268 to guide particles through the discharge openings 264, 266, 268 into the discharge chamber 258. As may be more clearly seen in FIG. 5, the guide members 272 each define an angle with regard to the radial direction R. The angle of guide members 272 may be between about ninety degrees and about one hundred and eighty degrees, such as between about one hundred and five degrees and about one hundred and sixty-five degrees, such as between about one hundred and twenty degrees and about one hundred and fifty degrees, such as about one hundred and thirty-five degrees.

During operation of dishwasher appliance 100, or more particularly, during a wash or rinse cycle of dishwasher appliance 100, wash fluid may enter filter assembly 204 through inlet 206 and travel to first filter member 214. The wash fluid may be filtered by first filter panel 220 wherein soils larger than the first filter openings 232 are prevented from flowing therethrough to second filter member 216. At the same time wash fluid and soils smaller than first filter openings 232 may pass therethrough to second filter member 216. The wash fluid may then be filtered by second filter panel 224, wherein soils larger than second filter openings 234 are prevented from flowing therethrough to third filter member 218, while wash fluid and soils smaller than second filter openings 234 may pass therethrough to third filter member 218. The wash fluid may then be filtered by third filter panel 228, wherein soils larger than third filter openings 236 are prevented from flowing to circulation pump 202, while the wash fluid to be recirculated may pass therethrough to circulation pump 202 and be recirculated into tub 104 and wash chamber 106.

Moreover, during operation of the exemplary dishwasher appliance 100, or more particularly during a wash or rinse cycle of the exemplary dishwasher appliance 100, the motor of circulation pump 202 may rotate shaft 210, which in turn may rotate impeller 208 and each of first, second, and third discharge blades 240, 242, 244. The rotation of first, second, and third discharge blades 240, 242, 244 by shaft 210 may allow discharge blades 240, 242, 244 to chop soils greater than the respective first, second, and third filter openings 232, 234, 236 and/or move soils outward along the radial direction R through the respective discharge openings 266, 268, 270. For example, first discharge blade 240 may move soils larger than first filter openings 232 outward along the radial direction R through the one or more first discharge openings 266 and into the discharge chamber 258. Similarly, second discharge blade 242 may move soils larger than second filter openings 234 outward along the radial direction R through the one or more second discharge openings 268 and into discharge chamber 258. Further, third discharge blade 244 may move soils larger than third filter openings 236 outward along the radial direction R through the one or more third discharge openings 270 and into discharge chamber 258.

Referring now to FIG. 6, as illustrated, discharge chamber 258 in exemplary embodiments is a circumferentially continuous discharge chamber 258. In other words, the chamber 258 is continuous generally annularly and along the circumferential direction, such that wash fluid in the chamber 258 can freely rotate in a generally continuous flow path along the circumferential direction, such as annularly within chamber 258. Such continuous design advantageously reduces backpressure in the continuous discharge chamber 258 and prevents potential backflow of particles from the continuous discharge chamber 258 through the discharge openings 266, 268, 270. Accordingly, particles that are removed from the filter members 214, 216, 218, such as from the panels 220, 224, 228 thereof, and traversed through the discharge openings 266, 268, 270 into the discharge chamber 258 may advantageously remain in the discharge chamber 258 until it is drained from the discharge chamber via outlet 260.

As discussed, particles (and wash fluid) may flow through the discharge openings 266, 268, 270 into the circumferentially continuous discharge chamber 258. Further, as discussed, guide members 272 may guide particles through the discharge openings 264, 266, 268 into the discharge chamber 258. The guide members 272 and openings 264, 266, 268 of each filter member 214, 216, 218 may be spaced apart from each other along the circumferential direction, as illustrated. For example, in some exemplary embodiments, each filter member 214, 216, 218 may include two openings 264, 266, 268 and two associated guide members 272. The two openings 264, 266, 268 and two associated guide members 272 of each filter member 214, 216, 218 may, for example, he spaced between 170 and 190 degrees apart, such as between 175 and 185 degrees apart, such as approximately 180 degrees apart along the circumferential direction. Alternatively, one, three, four or more openings 264, 266, 268 and associated guide members 272 may be utilized. Further, the openings 264, 266, 268 and associated guide members 272 may have any suitable spacing along the circumferential direction.

The filtered soils along with some accompanying wash fluid may be stored in discharge chamber 258 until wash cycle is complete and a discharge cycle is activated. During a discharge cycle, the drain pump is activated and wash fluid is pulled through, e.g., discharge chamber 258 and outlet 260 into and through a drain pipe (not shown). The drain pipe may be fluidly connected with a drain or other plumbing configured to dispose of such wash fluid and filtered particles. Notably, in certain embodiments, an appropriate amount of continuous flow of wash fluid, generated by lips 252 of the respective blades 240, 242, 244, may flow with filtered soils into discharge chamber 258 and through outlet 260 during a wash and/or rinse cycle of dishwasher appliance 100 In such an embodiment, a length of the drain pipe of the exemplary dishwasher appliance 100 may be filled with filtered/discharged soils and wash fluid (i.e., wash fluid that will not be recirculated). Such a configuration may accommodate storage of the filtered/discharged soils and accompanying wash fluid during a wash and/or rinse cycle of the exemplary dishwasher appliance 100. Additionally, in certain embodiments, the drain pump 156 may be activated for a relatively short period of time during, e.g., a wash or rinse cycle, in order to provide drainage of the wash fluid and filtered/discharged soils prior to a drain cycle.

Dishwasher appliance 100 in accordance with the present disclosure may more effectively and more quickly filter soils from wash fluid. More particularly, a dishwasher appliance 100 including a filter assembly 204 in accordance with the present disclosure may effectively filter all wash fluid to be recirculated in a single-pass. Accordingly, a dishwasher appliance 100 including a filter assembly 204 in accordance with the present disclosure may not be required to include circulation components capable of accommodating particles greater than a maximum size allowed by the fine filter (e.g., third filter member 218). Therefore, such an exemplary dishwasher appliance 100 may include, e.g., smaller nozzles on spray assemblies and/or smaller circulation conduits. This may allow the dishwasher appliance 100 to use less water, operate more efficiently, and include a less powerful circulation pump/motor. Additionally, a wash cycle of a dishwasher appliance 100 including an exemplary filter assembly 204 may run more quickly, as such an exemplary dishwasher appliance 100 need not circulate the wash fluid a multitude of times before all recirculated wash fluid is flowed through a fine filter (e.g., third filter member 218), It should be appreciated, however, that the exemplary sump 200 and filter assembly 204 depicted are provided by way of example only, and that in other exemplary embodiments sump 200 and filter assembly 204 may have any other suitable construction or configuration. For example, in other exemplary embodiments, filter assembly 204 may include any suitable number of filter members. For example, in other exemplary embodiments, filter assembly 204 may include at least two filter members, at least four filter members, or at least five filter members. Additionally, although each of the first, second, and third filter panels 220, 224, 228 are depicted extending in respective planes generally perpendicular to the axial direction A, in other embodiments, one or more of the first, second, and third filter panels 220, 224, 228 may have any other suitable shape (e.g., conical, slanted, etc.). Further, in other exemplary embodiments, filter assembly 204 may not include one or more of blades 240, 242, 244, and additionally, or alternatively, filter assembly 204 may include any other suitable configuration for blades 240, 242, 244 (e.g., one or more of the blades may include three or more arms, may not include lips 252, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly for filtering a wash fluid to be circulated by a circulation pump in a dishwasher appliance, the filter assembly defining an axial direction, a radial direction orthogonal to the axial direction, and a circumferential direction extending around the axial direction, the filter assembly comprising:

a first filter member including a first filter panel and defining a first discharge opening, the first discharge opening oriented along the circumferential direction;

a second filter member including a second filter panel and defining a second discharge opening, the second discharge opening oriented along the circumferential direction, the second filter panel spaced from the first filter panel along the axial direction and configured in series flow with the first filter panel such that the wash fluid is filtered by the first filter panel and by the second filter panel prior to being recirculated by the circulation pump;

a circumferentially continuous discharge chamber disposed radially outward of the first filter member and the second filter member, the discharge chamber in fluid communication with the first filter member through the first discharge opening and in fluid communication with the second filter member through the second discharge opening;

a housing, the housing comprising a peripheral wall, and wherein the first filter member includes a first outer wall extending around a perimeter of the first filter panel and the second filter member includes a second outer wall extending around a perimeter of the second filter panel, wherein the first discharge opening is defined in the first outer wall and the second discharge opening is defined in the second outer wall, and wherein the discharge chamber is defined between the peripheral wall and the first and second outer walls:

a first guide member slanting inwardly along the radial direction from the first outer wall adjacent to the first discharge opening; and a second guide member slanting inwardly along the radial direction from the second outer wall adjacent to the second discharge opening.

2. The filter assembly of claim 1, wherein the peripheral wall defines an outer, the outer configured for fluid communication with a drain pump.

3. The filter assembly of claim 1, wherein the first discharge opening is a plurality of first discharge openings and the second discharge opening is a plurality of second discharge openings.

4. The filter assembly of claim 1, wherein the first filter panel defines a plurality of first filter openings oriented along the axial direction, wherein the second filter panel defines a plurality of second filter openings oriented along the axial direction, and wherein the first filter openings are larger than the second filter openings.

5. The filter assembly of claim 1, further comprising a shaft, a first discharge blade, and a second discharge blade, wherein the shaft extends through the first filter member and the second filter member and is rotatable about the axial direction, wherein the first discharge blade is attached to the shaft and positioned adjacent to the first filter panel, wherein the second discharge blade is attached to the shaft and positioned adjacent to the second filter panel.

6. The filter assembly of claim 1, wherein the first filter panel is substantially parallel to the second filter panel.

7. The filter assembly of claim 1, further comprising a third filter member defining a third filter panel and defining a third discharge opening, the third filter panel spaced along the axial direction from the first and second filter panels and configured in series flow with the first and second filter panels, and wherein the discharge chamber is in fluid communication with the third filter member through the third discharge opening.

8. A dishwasher appliance defining a vertical direction, the dishwasher appliance comprising:

a tub defining a wash chamber;

a sump positioned at a bottom portion of the tub along the vertical direction;

a circulation pump for circulating a wash fluid in the sump to the wash chamber; and a filter assembly disposed within the sump and in flow communication with the circulation pump, the filter assembly defining an axial direction generally parallel to the vertical direction of the dishwasher appliance, a radial direction orthogonal to the axial direction, and a circumferential direction extending around the axial direction, the filter assembly comprising:

a first filter member including a first filter panel and defining a first discharge opening, the first discharge opening oriented along the circumferential direction;

a second filter member including a second filter panel and defining a second discharge opening, the second discharge opening oriented along the circumferential direction, the second filter panel spaced from the first filter panel along the axial direction and configured in series flow with the first filter panel such that the wash fluid is filtered by the first filter panel and by the second filter panel prior to being recirculated by the circulation pump; and a circumferentially continuous discharge chamber disposed radially outward of the first filter member and the second filter member, the discharge chamber in fluid communication with the first filter member through the first discharge opening and in fluid communication with the second filter member through the second discharge opening.

9. The dishwasher appliance of claim 8, wherein the filter assembly further comprises a housing, the housing comprising a peripheral wall, and wherein the first filter member includes a first outer wall extending around a perimeter of the first filter panel and the second filter member includes a second outer wall extending around a perimeter of the second filter panel, and wherein the discharge chamber is defined between the peripheral wall and the first and second outer walls.

10. The dishwasher appliance of claim 9, wherein the peripheral wall defines an outlet, the outlet configured for fluid communication with a drain pump.

11. The dishwasher appliance of claim 9, wherein the first discharge opening is defined in the first outer wall and the second discharge opening is defined in the second outer wall, further comprising a first guide member slanting inwardly along the radial direction from the first outer wall adjacent to the first discharge opening and a second guide member slanting inwardly along the radial direction from the second outer wall adjacent to the second discharge opening.

12. The dishwasher appliance of claim 8, Wherein the first discharge opening is a plurality of first discharge openings and the second discharge opening is a plurality of second discharge openings.

13. The dishwasher appliance of claim 8, wherein the first filter panel defines a plurality of first filter openings oriented along the axial direction, wherein the second filter panel defines a plurality of second filter openings oriented along the axial direction, and wherein the first filter openings are larger than the second filter openings.

14. The dishwasher appliance of claim 8, wherein the filter assembly further comprises a shaft, a first discharge blade, and a second discharge blade, wherein the shaft extends through the first filter member and the second filter member and is rotatable about the axial direction, wherein the first discharge blade is attached to the shaft and positioned adjacent to the first filter panel, wherein the second discharge blade is attached to the shaft and positioned adjacent to the second filter panel.

15. The dishwasher appliance of claim 8, wherein the first filter panel is substantially parallel to the second filter panel.

16. The dishwasher appliance of claim 8, wherein the filter assembly further comprises a third filter member defining a third filter panel and defining a third discharge opening, the third filter panel spaced along the axial direction from the first and second filter panels and configured in series flow with the first and second filter panels, and wherein the discharge chamber is in fluid communication with the third filter member through the third discharge opening.

17. The dishwasher appliance of claim 8, wherein the circulation pump is positioned adjacent to the filter assembly and configured to urge a flow of wash fluid through the filter assembly, wherein the filter assembly is configured such that all wash fluid to be recirculated has been filtered by the first filter panel and the second filter panel.

18. The dishwasher appliance of claim 8, wherein the circulation pump includes an impeller and a shaft, wherein the impeller is rotatable by the shaft, and wherein the shaft extends through the first filter member and the second filter member.

* * * * *

UNITED STATES PATENT AND TRADEMARK OFFICE
CERTIFICATE OF CORRECTION

PATENT NO. : 9,999,338 B2
APPLICATION NO. : 14/987862
DATED : June 19, 2018
INVENTOR(S) : Joel Charles Boyer It is certified that error appears in the above-identified patent and that said Letters Patent is hereby corrected as shown below:

In the Claims

Claim 1: In Column 12, Line 4 - "walls:" should read "walls;";

Claim 2: In Column 12, Line 12 - "an outer, the outer" should read "an outlet, the outlet";

Claim 12: In Column 13, Line 29 - "Wherein" should read "wherein".

Signed and Sealed this
Ninth Day of October, 2018

Andrei Iancu
*Director of the United States Patent and Trademark Office*